(12) United States Patent
Romano

(10) Patent No.: US 6,292,843 B1
(45) Date of Patent: Sep. 18, 2001

(54) QUICK LOADING OF RUN TIME DYNAMIC LINK LIBRARY FOR OS/2

(75) Inventor: Anthony Romano, Hughsonville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/008,001

(22) Filed: Jan. 16, 1998

(51) Int. Cl.$^7$ .............................. G06F 9/00; G06F 9/46; G06F 15/163

(52) U.S. Cl. ............................................................ 709/331

(58) Field of Search ............................ 709/305, 310–332

(56) References Cited

U.S. PATENT DOCUMENTS

| | | |
|---|---|---|
| 5,339,438 | 8/1994 | Conner et al. . |
| 5,375,241 | 12/1994 | Walsh . |
| 5,418,964 | 5/1995 | Conner et al. . |
| 5,421,016 | 5/1995 | Conner et al. . |
| 5,475,840 | 12/1995 | Nelson et al. . |
| 5,561,800 | 10/1996 | Sabatella . |
| 5,615,400 | 3/1997 | Cowsar et al. . |
| 5,623,695 * | 4/1997 | Lozinski et al. ........................ 710/8 |
| 5,628,016 | 5/1997 | Kukol . |
| 5,659,751 * | 8/1997 | Heninger ............................... 709/305 |
| 5,708,811 * | 1/1998 | Arendt et al. ......................... 395/712 |
| 5,802,367 * | 9/1998 | Held et al. ............................ 709/305 |
| 5,901,315 * | 5/1999 | Edwards et al. ...................... 395/704 |
| 5,916,308 * | 6/1999 | Duncan et al. ....................... 709/331 |
| 6,003,095 * | 12/1999 | Pekowski et al. .................... 709/305 |

OTHER PUBLICATIONS

Scott Powell, "Developing in C++ using dynamic link libraries", Object Magazine, 1992, pp. 51–56.*

IBM Technical Disclosure Bulletin, "Memory Protection Software Facility for OS/2 Shared Data Application", vol. 34, No. 4A, Sep. 1991.

IBM Technical Disclosure Bulletin, "Dynamic Linking in the System/370 and System/390 Architectures", vol. 34, No. 7B, Dec. 1991.

IBM Technical Disclosure Bulletin, "Data Collection Terminal Concentrator", vol. 35, No. 1A, Jun. 1992.

IBM Technical Disclosure Bulletin, "Software Performance Analysis Tools", vol. 38, No. 11, Nov. 1995.

IBM Technical Disclosure Bulletin, "Build Created C++ Template Instantiations", vol. 39, No. 03, Mar. 1996.

IBM Technical Disclosure Bulletin, "CALLOS2W", vol. 39, No. 04, Apr. 1996.

IBM Technical Disclosure Bulletin, "Linking to Potentially Imported Symbols in Windows 32–Bit Environment", vol. 39, No. 09, Sep. 1996.

* cited by examiner

*Primary Examiner*—Majid Banankhah
*Assistant Examiner*—P Caldwell
(74) *Attorney, Agent, or Firm*—DeLio & Peterson LLC; Peter W. Peterson; Margaret A. Pepper

(57) ABSTRACT

A process for exporting functions of a dynamic link library to an executable program on a computer provides a dynamic link library module adapted to export a plurality of desired functions, with each of the desired functions having a unique identification. The dynamic link library module includes a dispatching function adapted to recognize the unique identification each of the desired functions and export the desired function for execution by the program. There is also provided a look-up table for the executable program having therein a listing for each of the desired functions and unique identifications. The process includes loading the dynamic link library module with the program and calling the desired function by passing the desired function identification from the program to the dispatching function. Thereafter, the desired function is exported from the dynamic link library module to the program.

10 Claims, 2 Drawing Sheets

QUICK LOADING OF RUN TIME DYNAMIC LINK LIBRARY FOR OS/2

BACKGROUND OF THE INVENTION

1. Field of the Invention

The present invention relates to computer programming and, in particular, to a method of exporting functions of a dynamic link library for execution by an application program on a computer.

2. Description of Related Art

Computer operating systems such as OS/2 and Windows utilize dynamic link libraries as executable modules which contain services that application programs may utilize to perform different functions. Each dynamic link library (DLL) module may be written to contain a plurality of functions that may be utilized by different application programs running at the same time.

In addition, dynamic link libraries may be utilized to contain data and hardware such as typeface fonts in the case of the former and device drivers in the case of the latter. The dynamic link library is normally loaded into memory when an application program is running, and is not inserted into the executable file of the application program, such that the application program and dynamic link library are physically distinct.

Normally a programmer who develops a dynamic link library module that exports a plurality of functions has to create an explicit entry for each function exported in the DLL module definition file. In addition to the module definition file, each function must be prototyped, loaded and queried for its address. In the case of DLL software on the OS/2 operating system (available from International Business Machines Corporation) that exports 600 functions, there must be entered 600 lines of program in the module definition file, 600 lines for the function prototype, and 1200 lines for load and address query to the application protocol interface (API). Additionally, there may be another 601 lines of programming to function for error recovery. This may lead to a total of 1202 lines of overhead program.

In addition, the typical prior art DLL module would make over 600 calls to the operating system in order to execute the 600 DLL module functions. Every call to the operating system (also known as the kernel) is costly because of the extra processing time in the ring transition from ring 3 to ring 0 (discussed further below).

A prior art dynamic link library module OLDDLL.C for making available to application programs printing of the greetings Good Morning, Good Afternoon and Good Evening would typically include the following instructions (unless otherwise indicated, all programs herein are written in C programming language):

```
*/
#define INCL__DOSDATETIME
#define INCL__DOSFILEMGR
#define INCL__DOSMEMMGR
#include<os2.h>
#include<stdio.h>
#include<io.h>
#include<stdlib.h>
#include<math.h>
Func_A ( )
{
    printf("Good Morning/n");
```
-continued
```
}
Func_B ( )
{
    printf("Good Afternoon\n");
}
Func_C ( )
{
    printf("Good Evening\n"):
}
```

The DLL module OLDDLL.C as described has three functions, i.e., printing out the separate phrases Good Morning, Good Afternoon and Good Evening, when requested by an application program. These phrases are contained as Function A, Function B and Function C, respectively.

A typical prior art DLL definition file OLDDLL.DEF would include the following instructions:

LIBRARY olddll INITINSTANCE TERMINSTANCE;
   tells linker to build DLL, not EXE
DATA MULTIPLE NONSHARED
EXPORTS
   Func$_A$
   Func$_B$
   Func$_C$ The file OLDDLL.DEF is the definition file which must be given to the operating system complied at the time the program is to be complied. The lines following EXPORT list every function which may be exported from the DLL, Func_A, Func_B and Func_C. For a DLL file having N functions, there would be N lines of programming in the EXPORT list.

A typical prior art executable application program TESTOLD.C would include the following instructions:

```
*/
#define INCL__WIN
#define INCL__DOS
#include <os2.h>              /* System Include File
*/
#include<stdio.h>
#include<process.h>
#include<stdlib.h>
CHAR    objbuff [100];
HMODULE hmodScreen;
void ( *pfnFunc_A) (void);
void ( *pfnFunc_B) (void);
void ( *pfnFunc_C) (void);
main( )
{
APIRET rc";
    rc = DosLoadModule    (objbuff,  100,  "OLDDLL.C",
&hmodScreen )";
    if(rc) {
        printf("Error: Loading the DLL\n");
        ErrorHandler( );
        cleanup( );
    }
    rc = DosQueryProcAddr (hmodScreen, O, "Func_A",
                (PFN *)&pfnFunc_A);
    if(rc) {
        printf("Error: Query Address for funcA\n");
        ErrorHandler( );
        cleanup( );
    }
    rc = DosQueryProcAddr (hmodScreen, O, "Func_B",
                (PFN *)&pfnFunc_B );
    if(rc) {
```

```
        printf("Error: Query Address for funcB\n");
        ErrorHandler( );
        cleanup( );
    }
    rc = DosQueryProcAddr (hmodScreen, O, "Func_C",
                (PFN *)&pfnFunc_C );
    if(rc) {
        printf("Error: Query Address for funcC\n");
        ErrorHandler( );
        cleanup( );
    }
    pfnFunc_A( );
    pfnFunc_B( );
    pfnFunc_C( );
    rc=DosFreeModule(hmodScreen);
    if(rc)
        printf("Error: DosFreeModule failed rc=%d\n",rc);
}
ErrorHandler( )
{
    ;
}
cleanup( )
{
    ;
}
```

The DosLoadModule statement is an API call to the OS/2 operating system kernel to load the DLL "OLDDLL.C". After loading the DLL the return code (rc) is checked. Then the statement DosQueryProcAddr is used to query each of the addresses of the functions A, B and C. Each DosQueryProcAddr is a separate API call to the OS/2 kernel. The application program then is able to use the DosQueryProcAddr by the statement pfnFunc_A, pfnFunc_B or pfnFunc_Cwithin the DLL.

In operating the DLL module, there are a total of four API calls made to the operating system kernel, one to load the DLL and one for each of the three functions within the DLL module. For the example of 600 functions, there would be 601 API calls to the kernel. Likewise, the number of calls to the kernel for a DLL module having N function is N+1.

Accordingly, it is quite complex and costly in terms of computer execution time to increase the number of functions in a DLL available for use by an application program.

Bearing in mind the problems and deficiencies of the prior art, it is therefore an object of the present invention to provide a dynamic link library that provides better performance and fewer program lines to run.

It is another object of the present invention to provide a smaller application program which uses a DLL module.

A further object of the present invention is to provide a smaller module definition file in the DLL.

It is yet another object of the present invention to provide for fewer API calls to the operating system kernel during DLL module use.

A further object of the present invention is to provide improvement in the performance utilizing a DLL module.

Still other objects and advantages of the invention will in part be obvious and will in part be apparent from the specification.

SUMMARY OF THE INVENTION

The above and other objects, which will be apparent to those skilled in the art, are achieved in the present invention which provides in one aspect a process for exporting functions of a dynamic link library to an executable program on a computer by providing a dynamic link library module adapted to export a plurality of desired functions, with each of the desired functions having a unique identification. The dynamic link library module includes a dispatching function adapted to recognize the unique identification of each of the desired functions and export the desired function for execution by the program. There is also provided a look-up table for the executable program having therein a listing for each of the desired functions and unique identifications. The process includes loading the dynamic link library module with the program and calling the desired function by passing the desired function identification from the program to the dispatching function. Thereafter, the desired function is exported from the dynamic link library module to the program.

A plurality of functions may be called by passing the desired function identification for each of the functions from the program to the dispatching function, such that the desired function is exported in a group to the program. Exporting of the desired function may be by transferring control of execution of the desired function to the program, and executing the desired function with the program.

The present invention also provides a program storage device readable by a machine (such as a computer), tangibly embodying a program of instructions executable by the machine to perform the aforementioned method of exporting functions of a dynamic link library to an executable program on a computer.

In another aspect, the present invention relates to a system for exporting desired functions of a dynamic link library to an executable program on a computer comprising an executable program including a look-up table having therein a listing for each of the desired functions and a unique identification for each of the desired functions, and a dynamic link library module. The dynamic link library module comprises a plurality of the desired functions, each of the desired functions having a unique identification, and a dispatching function adapted to recognize the unique identification of each of the desired functions and export the desired function for execution by the program upon receipt of the unique identification.

In yet another aspect, the present invention relates to a dynamic link library capable of being loaded by an executable program on a computer comprising a plurality of desired functions, each of the desired functions having a unique identification and a dispatching function adapted to recognize the unique identification of each of the desired functions. The dynamic link library also includes means for exporting the desired function for execution by the program upon receipt of the unique identification. The dynamic link library module is preferably adapted to export a plurality of the desired functions in a group to the program. The dynamic link library module is preferably also adapted to transfer control of execution of the desired function to the program and the program is adapted to execute the desired function.

The dynamic link library module and program are on a computer usable medium and are contained in computer usable program code. Preferably, the dynamic link library module and program are executable by an OS/2 operating system.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
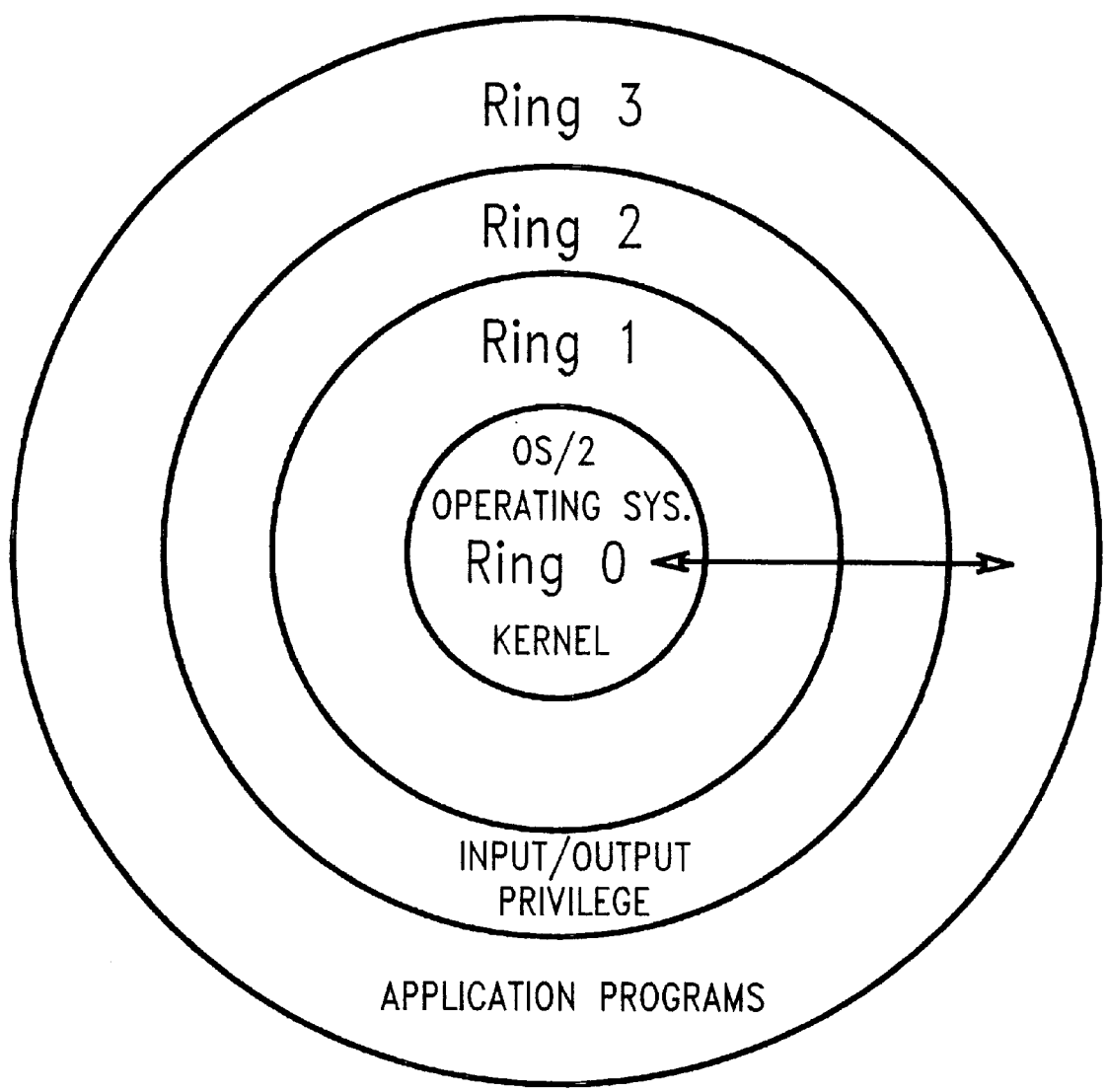
FIG. 1 is a schematic of the OS/2 operating system operation levels, including those utilized in the present invention.

In describing the preferred embodiment of the present invention, reference will be made herein to FIGS. 1 and 2 of the drawings in which like numerals refer to like features of the invention. Features of the invention are not necessarily shown to scale in the drawings.

The present invention is particularly useful in connection with the OS/2 operating system of International Business Machines Corporation. The levels of operations in a computer operating system, such as the OS/2 operating system, is depicted in FIG. 1. The different levels of programming are shown as concentric rings emanating from ring 0, which contains the OS/2 operating system kernel. Ring 1 is not used. Ring 2 contains the input/output privilege (IOPL Mode). Ring 3 is where the application programs reside. In executing an application program, every call 10 from the program level Ring 3 to the operating kernel Ring 0 utilizes valuable program execution time and space. The present invention minimizes the number of API kernel calls which are necessarily made in accessing a dynamic link library which has a plurality of functions.

Figure 2:
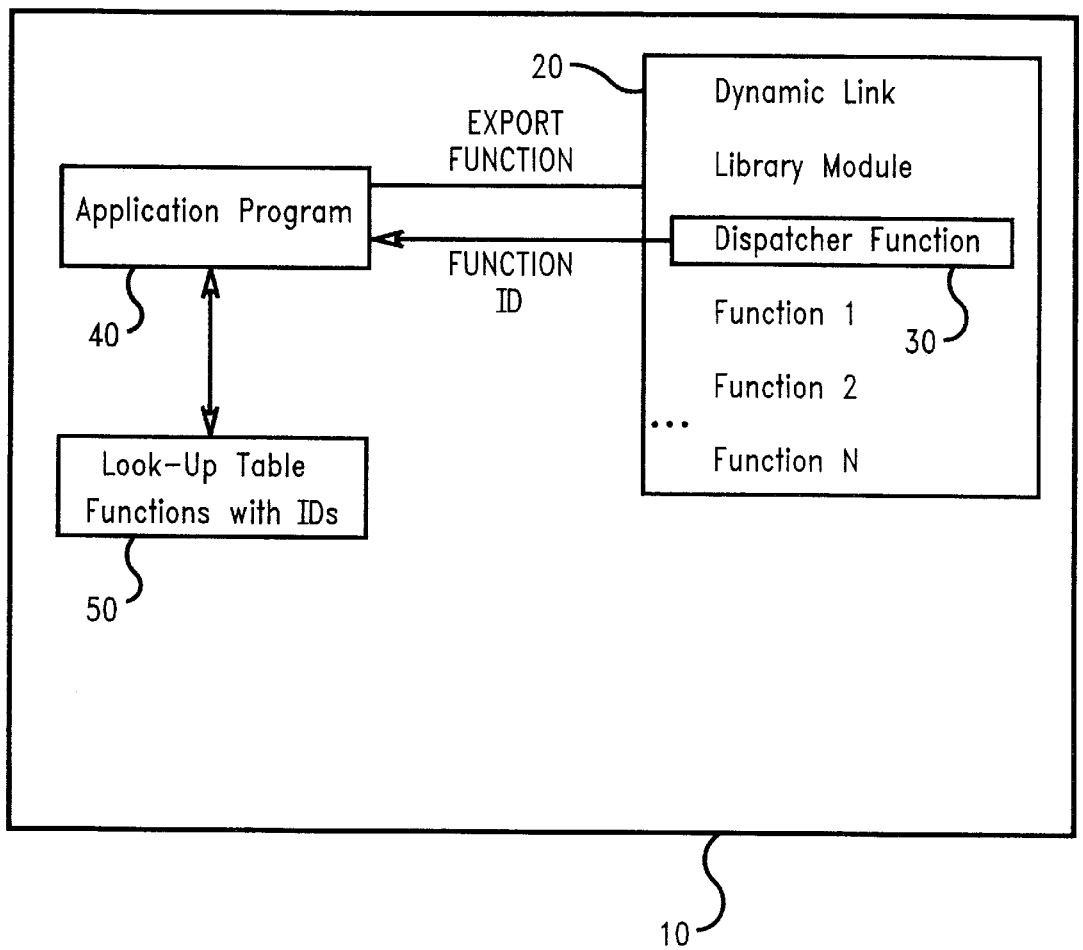
FIG. 2 is a block diagram of the preferred method of exporting functions of a dynamic link library to an executable program on a computer.

FIG. 2 depicts in schematic form the system and operation of the present invention as installed in the memory of a computer. A dynamic link library module 20 and application program 40 are stored on a program storage device 10 of a computer. Dynamic link library module 20 contains a number of functions N which are to be utilized by an application program 40. As part of DLL module 20, there is also provided a dispatcher function 30, which will be described further below. Each function 1-N in DLL 20 contains a unique identification, which may be any identification scheme. Application program 40 contains, or is associated with, a look-up table 50. Look-up table 50 contains a list of various functions contained in DLL module 20 along with the identification of each of the functions.

When application program 40 desires to execute one or more functions in DLL module 20, the application program first loads DLL module 20. After loading the DLL module, the application program calls the one or more desired functions by passing the unique function identification(s) from the program 40 to the dispatcher function 30. Dispatcher function 30 then exports the group of one or more desired functions to the program by transferring control of the execution of the desired functions to the program and then permitting the program to execute the desired function.

An example of a preferred application program and DLL module made in accordance with the present invention is given below. The program of instructions may be stored on a program storage device, such as a semiconductor chip, a read-only memory, or magnetic media such as a diskette or computer hard drive, which is readable and executable by a computer, preferably one using an OS/2 operating system.

EXAMPLE

A preferred DLL module NEWDLL.C made in accordance with the present invention includes the following instructions:

```
*/
#define INCL_DOSDATETIME
#define INCL_DOSFILEMGR
#define INCL_DOSMEMMGR
#include<os2.h>
#include<stdio.h>
#include<io.h>
#include<stdlib.h>
#include<math.h>
Disp_func(int funcid)
{
    if(funcid==1)
       Func_A ( );
    if(funcid==2)
       Func_B ( );
    if(funcid==3)
       Func_C ( );
}
Func_A( )
{
    printf("Good Morning\n");
}
Func_B ( )
{
    printf("Good Afternoon\n");
}
Func_C ( )
{
    printf("Good Evening\n"):
}
```

The dispatcher function in accordance with the present invention is the statement Disp_func which accepts a desired function identification parameter called funcid. If the funcid is 1, the dispatcher function calls function A which prints Good Morning; if the funcid is 2, the dispatcher function calls function B which prints Good Afternoon; and if the funcid is 3, the dispatcher function calls function C which prints Good Evening. Functions A, B and C are, in essence, hidden from the main application program, and only the dispatcher function is exposed to the main program.

A preferred executable application program TESTNEW.C made in accordance with the present invention includes the following instructions:

```
*/
#define INCL_WIN
#define INCL_DOS
#include <os2.h>         /* System Include File
*/
#include<stdio.h>
#include<process.h>
#include<stdlib.h>
CHAR    objbuff [100];
HMODULE hmodScreen;
void ( *pfnDisp_func) (int );
main( )
{
    APIRET rc:
    DATETIME   datetime;  /* structure for the os2
DosGetDateTime */
    char Date_s[30],Time_s{80};
    rc = DosLoadModule (objbuff, 100, "NEWDLL.C", &hmodScreen
);
    if(rc) {
        printf("Error: Loading the DLL\n");
        ErrorHandler( );
        cleanup( );
}
rc = DosQueryProcAddr (hmodScreen, O, "Disp_func",
```

```
                (PFN *)&pfnDisp_func );
if(rc) {
        printf("Error: Query Address for Disp_func\n");
        ErrorHandler( );
        cleanup( );
}
pfnDisp_func(1);
pfnDisp_func(2);
pfnDisp_func(3);
rc=DosFreeModule(hmodScreen);
if(rc)
        printf("Error: DosFreeModule failed rc=%d\n",rc);
}
ErrorHandler( )
{
        ;
}
cleanup( )
{
        ;
}
```

In the TESTNEW.C program, the DosLoadModule command loads the DLL of the present invention, named "NEWDLL.C"with one API call to the operating system kernel. The next API call DosQueryProcAddr loads the dispatcher function Disp func. This step, DosQueryProcAddr, only queries the address of the dispatch function and loads that function. The dispatcher function is then called from within the DLL by the statements pfnDisp_func (1) for function 1, pfndisp_func (2) for function 2, and the like. This command passes the desired function identification to the DLL program NEWDLL.C's dispatcher function. The dispatcher function in NEWDLL.C then determines which functions A, B and/or C to execute. As can be seen, the present invention only utilizes two API calls for the three functions, rather than the four API calls for the three functions as would be made in the prior art. Any number of additional functions may also be exported with only the two kernel calls. For example, if the DLL module contains 600 functions, there would still be only two kernel calls made to export the 600 functions to an application program. In the prior art, 601 kernel calls would be necessary for these 600 functions.

A preferred DLL definition file NEWDLL.DEF made in accordance with the present invention includes the following instructions:

LIBRARY newdll INITINSTANCE TERMINSTANCE;
    tells linker to build DLL, not EXE
DATA MULTIPLE NONSHARED
EXPORTS
Disp_func The definition file NEWDLL.DEF of the present invention only exports one function, the dispatcher function Disp_func, regardless of the number of functions in the DLL module. This contrasts with the definition file in accordance with the prior art, which would have one line for each of the N number of functions contained in the DLL.

Accordingly, the present invention reduces calls to the kernel of the operating system when executing the functions of the DLL module. Additionally, there are considerably fewer lines of programming and bytes utilized in memory.

Table 1 below shows a computation of the number of bytes utilized with a prior art program for functions A, B and C (described in part in the Background section herein) as compared to the present invention (described in part above).

TABLE 1

| NO. OF BYTES UTILIZED | | | |
|---|---|---|---|
| Prior Art | | Present Invention | |
| OLDDLL.OBJ | 418 | NEWDLL.OBJ | 477 |
| TESTOLD.OBJ | 1084 | TESTNEW.OBJ | 822 |
| OLDDLL.DEF | 151 | NEWDLL.DEF | 138 |
| TESTOLD.DEF | 27 | TESTNEW.DEF | 27 |
| TOTAL | 1653 | TOTAL | 1437 |

As is seen, the prior art method utilized 1653 bytes, compared to the new method which utilized 1437 bytes. The new method had a 13% size reduction for only the three simple functions shown. As the number of functions is made to increase, the reduction in number of bytes utilized will also increase, not only in term of actual bytes, but also in terms of percentage of size reduction. Additionally, there will always be only two kernel calls for N number of functions, compared to N+1 kernel calls made in accordance with the prior art system. This, along with the smaller module definition file, contributes to performance improvement in the entire system.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for exporting functions of a dynamic link library to an executable program on a computer comprising:
    a) providing a dynamic link library module adapted to export a plurality of desired functions, each of said desired functions having a unique identification, said dynamic link library module including a dispatching function adapted to recognize said unique identification each of said desired functions and export said desired function for execution by said program;
    b) providing a look-up table for said executable program having therein a listing for each of said desired functions and unique identifications;
    c) loading said dynamic link library module with said program;
    d) using said application program, directly calling said desired function by passing the desired function identification from said program to said dispatching function;
    e) exporting said desired function from said dynamic link library module to said program; and
    f) executing said desired function using said program.

2. The process of claim 1 wherein in step (d) a plurality of functions are called by passing the desired function identification for each of said functions from said program to said dispatching function, and wherein in said step (e) said desired function is exported in a group to said program.

3. The process of claim 1 wherein step (e) exporting of said desired function is by:
    i) transferring control of execution of said desired function to said application program; and
    ii) executing said desired function with said application program.

4. A system for exporting desired functions of a dynamic link library to an executable application program on a computer comprising:

an executable application program including a look-up table having therein a listing for each of said desired functions and a unique identification for each of said desired functions; and a dynamic link library module comprising a plurality of said desired functions, each of said desired functions having a unique identification, and a dispatching function within said dynamic link library module adapted to recognize said unique identification of each of said desired functions and export said desired function for execution by said application program upon receipt of said unique identification directly from said application program.

5. The system of claim 4 wherein said dynamic link library module is adapted to export a plurality of the desired functions in a group to said program.

6. The system of claim 4 wherein said dynamic link library module is adapted to transfer control of execution of said desired function to said program and said program is adapted to execute said desired function.

7. A program storage device readable by a machine, tangibly embodying a program of instructions executable by the machine to perform a method of exporting functions of a dynamic link library to an executable application program on a computer, said method comprising:

a) providing a dynamic link library module adapted to export a plurality of desired functions, each of said desired functions having a unique identification, said dynamic link library module including a dispatching function adapted to recognize said unique identification each of said desired functions and export said desired function for execution by said application program;

b) providing a look-up table for said executable program having therein a listing for each of said desired functions and unique identifications;

c) loading said dynamic link library module with said application program;

d) using said application program, directly calling said desired function by passing the desired function identification from said application program to said dispatching function; and e) using said dispatching function, exporting said desired function directly from said dynamic link library module to said application program.

8. The program storage device of claim 7 wherein in step (d) of the method a plurality of functions are called by passing the desired function identification for each of said functions from said program to said dispatching function, and wherein in said step (e) of the method said desired function is exported in a group to said program.

9. The program storage device of claim 7 wherein method step (e) exporting of said desired function is by:

i) transferring control of execution of said desired function to said program; and ii) executing said desired function with said program.

10. The program storage device of claim 7 wherein said program is executable by an OS/2 operating system.

* * * * *